May 11, 1926.
M. E. SEELY
CLUTCH
Filed August 12, 1922
1,584,246
2 Sheets-Sheet 2
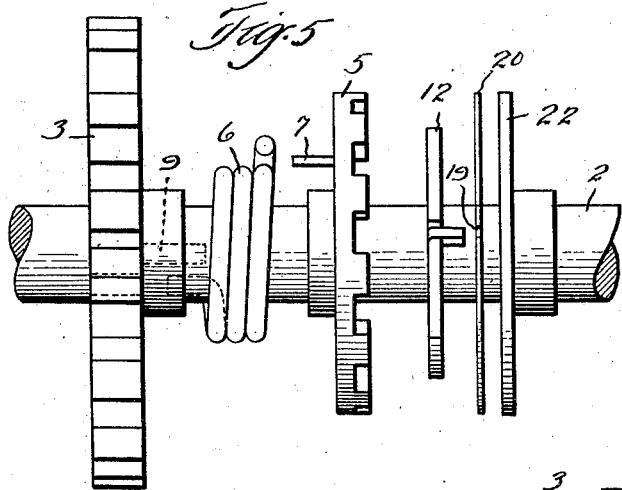
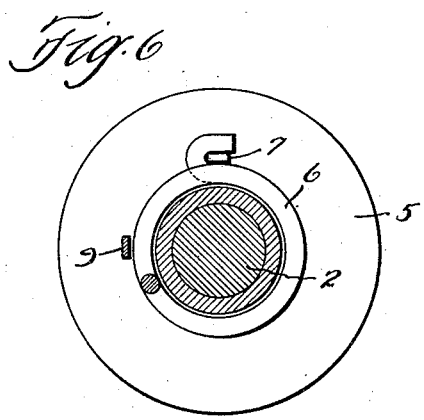
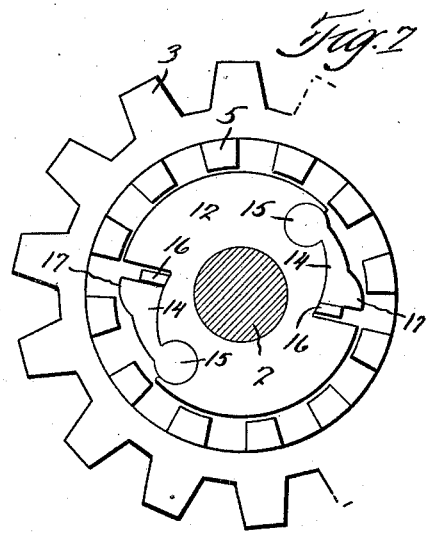
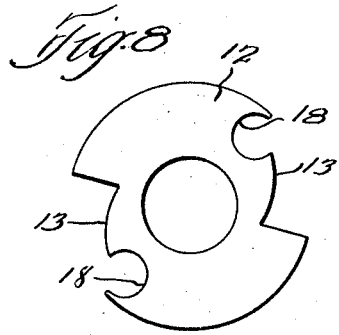
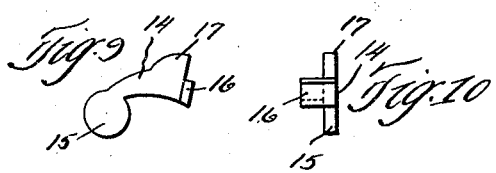
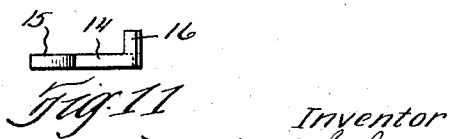
Inventor
Martin E. Seely
By Hull, Brock & West
Attys.

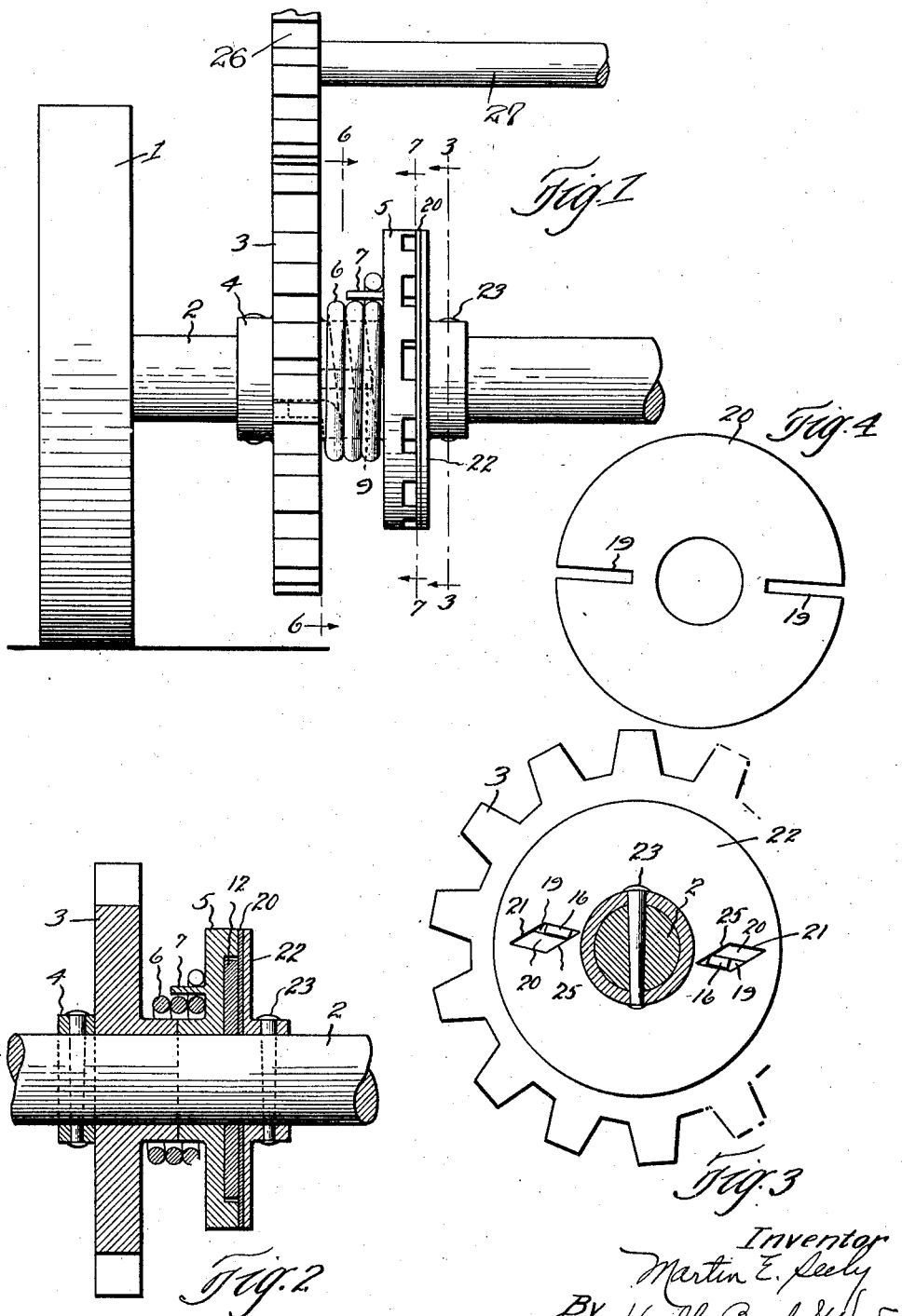

Patented May 11, 1926.

1,584,246

UNITED STATES PATENT OFFICE.

MARTIN E. SEELY, OF CLEVELAND, OHIO.

CLUTCH.

Application filed August 12, 1922. Serial No. 581,464.

This invention relates to a clutch mechanism and while capable of other uses it has particular reference to a clutch mechanism for use in connection with hand operated sweepers wherein power for the sweeper mechanism is derived by engagement of the sweeper wheels with the floor or surface to be cleaned.

Some of the objects of the present invention are to provide a clutch mechanism of this character which will transmit power when rotated in one direction and will be automatically disengaged when rotated in an opposite direction; to provide a clutch mechanism which shall include a resilient driving connection, thereby to cushion the impact of engagement of the driving member with the mechanism to be driven; to provide a clutch mechanism which shall be positive and noiseless in action and which may be used with or without lubrication; to provide a clutch mechanism of the aforesaid character which shall be efficient in operation, and which shall consist of a few parts which are simple in construction and inexpensive to manufacture, while further objects and advantages will appear as the description proceeds.

In the accompanying drawings wherein I have shown an embodiment of my invention, Fig. 1 is a side elevation of my clutch showing the same attached to a portion of a driving and driven mechanism such as a hand operated sweeper; Fig. 2 is a vertical sectional view through the clutch mechanism; Fig. 3 is a sectional view taken on the line 3—3 of Fig. 1; Fig. 4 is a plan view of one of the clutch elements; Fig. 5 is a side elevation of the clutch showing the elements separated and ready for assembly; Figs. 6 and 7 are sectional views taken respectively on the lines 6—6 and 7—7 of Fig. 1; Fig. 8 is a plan view of one of the clutch elements; and Figs. 9, 10 and 11 are respectively a plan view, end elevation, and side elevation of one of the detents.

Describing by reference characters the various parts illustrated, 1 denotes the driving wheel, which in the present instance is of the friction type and derives its power by rolling contact with the floor or other surface when moved thereover. This wheel is fastened to a shaft 2 which has journalled thereon a driven gear 3, which is disposed between a collar 4 pinned to said shaft, and a crown gear 5 which is also journalled on said shaft. Interposed between gears 3 and 5 and arranged about the hub portions thereof is a coil spring 6. One end of this spring is engaged in an aperture formed in the side of gear 3 and the other end thereof is looped about a projection 7 extending from a side face of crown gear 5. A projection 9 also extends from a side of gear 3 and under certain conditions is adapted to contact with projection 7 to form a driving connection therewith as will be more fully explained hereinafter.

Loosely journalled on shaft 2, and aranged within the recess defined by the teeth of crown gear 5 is a disk 12 which is formed with oppositely disposed notches 13, 13. These notches each receive a detent 14 which is provided with a circular base 15, a laterally projecting lug 16 and a toe 17, the base 15 of each detent being rotatably mounted in its respective seat 18 of disk 12. The lugs 16 project through diametrically arranged slots 19 formed in a disk 20 and also through diametrically arranged diamond shaped openings 21 formed in a disk 22. Disk 20 is loosely mounted on shaft 2 and is disposed between the teeth of the crown gear 5 and disk 22, the latter being fastened to shaft 2 by a pin 23.

In operation, the driving wheel 1 is moved over the floor or other surface to impart a rotational movement to shaft 2 in a counter clock-wise direction, as viewed from the left hand end of Fig. 1. This serves to rotate disk 22 which in turn imparts a rotational movement to disks 20 and 12 by virtue of the connection through lugs 16 of detents 14. In effecting a rotational movement between disk 22 and disks 20 and 12 however, the lugs 16 move outwardly along the inclined edge 25 of each of the diamond shaped openings 21 until the toe 17 of each detent engages a tooth of crown gear 5. This serves to rotate the crown gear which transmits its motion through projection 7 and spring 6 to gear 3. Gear 3 is meshed with a gear 26 which is mounted on a counter shaft 27 and this shaft is operatively connected with the mechanism (not shown) which is to be driven. On the return stroke of the device, the driving wheel 1, shaft 2 and disk 22 are rotated in an opposite direction. This causes lugs 16 to ride up the inclined surface 21 of the diamond shaped openings and withdraw the toes 17 of the detents from engagement with the teeth of the crown gear 5. The crown gear 5 and driven gear 3 are therefore disconnected from shaft 2 and remain inoperative during reverse movement of shaft 2.

It will be observed that slots 19 in disk 20 prevent the detents from falling by gravity and engaging with the teeth of the crown gear should the device be stopped with the diamond shaped openings 21 in a vertical position.

It will also be noted that spring 6 forms a resilient connection between gears 5 and 3 and serves to absorb the impact of engagement of the clutch. Should this spring break at any time, the projection 7 will contact with projection 9 on gear 3 and serve as temporary driving connection until a new spring can be inserted.

While I have described my clutch in connection with a hand power sweeper, it will be obvious that it may be used in any instance where it is desired to drive a mechanism upon rotation in one direction and disconnect said drive upon reverse rotation.

Having thus described my invention, what I claim is:

1. A clutch mechanism of the character set forth comprising a shaft adapted to be rotated in opposite directions, a crown gear journaled on said shaft, a driven member journaled on said shaft, means operatively connecting said gear and said member, a plate journaled on said shaft, a detent carried by said plate and having a lateral projection adapted to engage the teeth of said gear, a second plate journaled on said shaft and having a radial slot therein adapted to receive said lateral projection, and a third plate fastened to said shaft and having an aperture therein adapted to receive said lateral projection, said second and third plates being adapted to force said detent into engagement with said crown gear upon rotation of said shaft in one direction and disengage said detent upon rotation of said shaft in an opposite direction.

2. A clutch mechanism of the character set forth comprising a shaft adapted to be rotated in opposite directions, a crown gear journaled on said shaft, a driven member journaled on said shaft, means operatively connecting said gear and said member, a plate journaled on said shaft and disposed within said gear, a plurality of detents carried by said plate and each having a lateral projection adapted to engage the teeth of said gear, a second plate journaled on said shaft and having a plurality of radial slots therein each adapted to receive a lateral projection on said detents, and a third plate fastened to said shaft and having a plurality of diamond shaped apertures therein, each adapted to receive one of said lateral projections, the inclined edges defining said apertures being adapted to force said detents into engagement with the teeth of said gear when said shaft is rotated in one direction and disengage said detents upon rotation of said shaft in an opposite direction.

In testimony whereof, I hereunto affix my signature.

MARTIN E. SEELY.